March 20, 1962 R. W. WOLKE ET AL 3,026,463
SPEED CONTROL SYSTEM FOR D.C. MOTORS
Filed Oct. 22, 1959 2 Sheets-Sheet 1

INVENTORS
RICHARD W. WOLKE
ERNEST F. KUBLER
BY *Vernon F. Kalb*
ATTORNEY

United States Patent Office 3,026,463
Patented Mar. 20, 1962

3,026,463
SPEED CONTROL SYSTEM FOR D.C. MOTORS
Richard W. Wolke and Ernest F. Kubler, Waynesboro, Va., assignors to General Electric Company, a corporation of New York
Filed Oct. 22, 1959, Ser. No. 847,925
4 Claims. (Cl. 318—327)

This invention relates to speed-regulated drive systems for dynamoelectric machines, and more particularly relates to such a drive system wherein electrical energy is supplied to the machine through a magnetic amplifier.

The speed of a motor at full field excitation and rated armature voltage is referred to as the base speed of the machine. Speed control of a motor within the base speed range is usually accomplished by regulation of armature voltage which may be controlled by provision of a speed control loop.

In this type of system a speed reference signal is compared with a signal indicative of the actual speed of the motor and a resultant error signal, indicative of the difference between the desired speed and the actual speed is applied to a power amplifier which supplies electrical energy to the motor. In order to achieve rapid response of the motor speed to a commanded speed change or to rapidly regulate the speed when the load upon the motor is varied, it is necessary to have high gain amplifying elements in the drive system in order that small error signals will control sufficient power input to the motor to effect the desired speed response. However, high gain systems may create stability problems if provision is not made for compensating for transient impulses introduced into the drive system. The less time required for the motor to achieve and to hold a desired speed, the better is the response; thus, it may be seen that the ultimate objective is to provide a speed-regulated drive having rapid speed response to correct or change motor speed, compatible with good system stability.

Additionally, it is highly desirable to impose a current limit on the motor which may be dictated by the type of load or the capacity of the motor. It is further desirable to maintain a speed-regulated drive as simple as possible. Some systems attempt to establish current limit control by deriving a voltage proportional to armature current and comparing this to a reference signal to provide a current limiting signal or alternatively to reduce the gain of the drive system. The addition of feedback networks in speed-regulated drives may make the system more complex by adding circuitry and circuit elements which circulate transient signals, thereby adversely affecting the stability of the system.

Accordingly, it is an object of our invention to provide an improved speed-regulated drive having rapid response and good stability.

It is another object of our invention to provide in a regulated drive system utilizing a magnetic power amplifier improved load current regulating means.

It is a further object of our invention to provide in a speed regulated drive utilizing a magnetic amplifier improved armature current regulating means.

It is a still further object of our invention to provide an improved, low cost current limit control in a speed-regulated drive for a direct current motor.

Briefly stated, the objectives of our invention are achieved in one aspect by providing a magnetic amplifier to supply electrical energy to the motor whose speed is to be controlled, and providing negative armature current feedback to a control winding on the magnetic amplifier. The main and feedback control windings are so chosen that the magnetic amplifier produces output current linearly proportional to input control current. By properly choosing the number of feedback winding turns (and control turns), the output current of the magnetic amplifier will be held proportional to input current substantially independent of the output voltage of the magnetic amplifier. By placing a maximum limit on the input control current, a maximum current limit is therefore established for the output load current.

The addition of the negative current feedback winding besides linearizing the input-output control characteristic, contributes to system stability by decreasing the system phase shift in its gain frequency response diagram. By means of this armature current regulation, over acceleration of the armature with resultant tendencies toward instability are obviated. The negative current feedback will of course decrease the gain of the magnetic amplifier; however, this loss of gain may be recovered in the preamplifier.

It is acknowledged that the principle of use of negative feedback to improve operating characteristics of an amplifier is not new, particularly in radio frequency electronic circuitry, and we do not claim the broad use of this principle as our discovery. Our invention in one aspect resides in the novel manner in which we utilize negative current feedback on a magnetic power amplifier in a regulated drive for a dynamoelectric machine to improve response and regulate current.

The novel features of the invention are set forth with particularity in the appended claims. The invention itself, however, both as to its organization and operation, together with further objects and advantages thereof, may best be understood when taken in connection with the following drawing, wherein:

Figure 1:
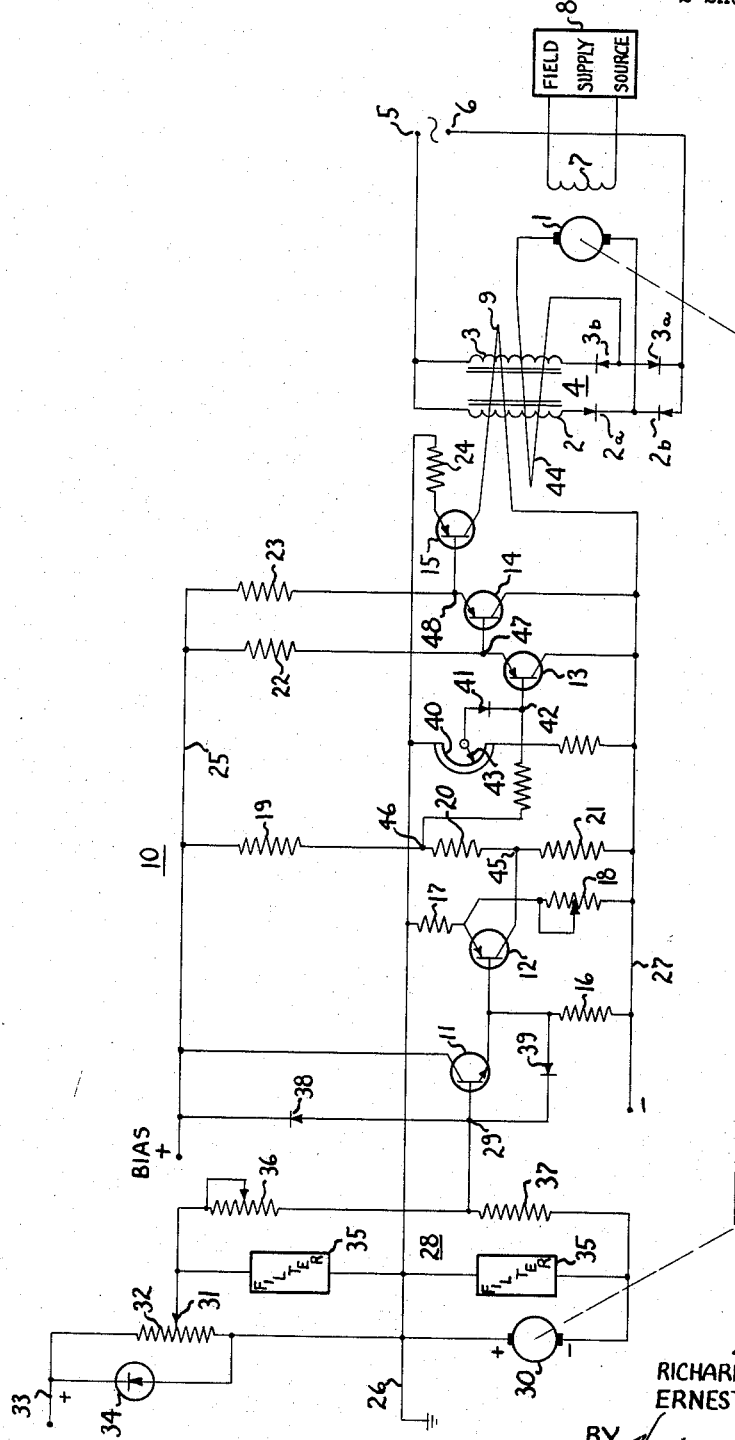
FIGURE 1 illustrates a speed-regulated drive embodying our invention.

Referring now to FIG. 1, a speed-regulated motor drive system embodying our invention is shown. The system comprises a direct current motor 1, whose armature is supplied electrical energy through gate windings 2 and 3 of magnetic amplifier 4. The gate windings 2 and 3 include rectifiers 2a, 2b and 3a, 3b respectively. Alternating current energy is supplied to gate windings 2 and 3 from terminals 5 and 6 which are connected to an alternating current source, not shown, and unidirectional electrical energy is supplied to the motor armature by means of the rectifiers 2a, 2b, 3a and 3b. The field 7 of the motor 1 is energized from a field supply source 8. The motor 1 is connected to drive a load, not shown. A control winding 9 is provided on magnetic amplifier 4 to vary the reactance of gate windings 2 and 3. Control current is supplied to winding 9 through a preamplifier 10, which may be composed of cascaded transistors 11, 12, 13, 14 and 15, with associated resistance elements 16 through 24. It is to be understood that the preamplifier 10 need not be composed of transistor elements, but may be comprised of other amplifying devices. Bias potentials are applied to the transistor electrodes over positive bias line 25 and ground connection 26. Line 27 is energized from a negative voltage source to supply drive voltage to the transistors 11–15.

A control signal is applied to control winding 9 through preamplifier 10 from a comparison circuit 28 which furnishes a speed error signal to point 29 at the base of transistor amplifier 11. The error signal may be derived from a comparison of the output voltage of a tachometer 30 driven by motor 1 and speed reference voltage determined by the setting of slider 31 on potentiometer 32. The voltage indicative of actual motor speed may be derived by other means known to those skilled in the art, not requiring a tachometer. A constant potential is applied across potentiometer 32 from a speed reference voltage source, not shown, connected to point 33. A Zener diode 34 may be connected across potentiometer 32 to maintain the voltage thereacross constant.

Filters 35 are provided to remove any ripples appearing on the tachometer or reference voltages. Resistors 36 and 37 in the speed reference and tachometer circuits respectively are connected in series. A current will circulate in this series circuit determined by the speed reference and tachometer voltages and the value of resistors 36 and 37.

A speed error signal appearing at point 29 is applied to the base of transistor 11 which is held within a predetermined potential range by means of rectifiers 38 and 39. Predetermined biases are established on the transistor electrodes by means of the bias potential source not shown, connected to line 25, ground connection 26 and the several voltage dividers composed of the resistor elements. These means of biasing are well known to those skilled in the art and need not be explained here in detail.

In accordance with one aspect of our invention, hereinafter discussed in more detail, a potential reference limit is placed on the base of transistor 13 with respect to ground by means of potentiometer 40 and diode 41 connected between line 26 and point 42. This limit may be varied by movement of slider 43 on potentiometer 40.

In accordance with the most important aspect of our invention, negative armature current feedback is applied to the magnetic amplifier by means of winding 44 on magnetic amplifier 4. Winding 44 is serially connected with the armature of motor 1.

Considering now the operation of the system, an error signal whose magnitude depends on the current in the comparison circuit 28 is applied to the base of transistor 11 at point 29. Rectifiers 38 and 39 prevent point 29 from going positive with respect to line 28 or negative with respect to the emitter of transistor 11. Assume that load on the motor is suddenly increased and the motor speed falls, the voltage at point 29 will become less negative with respect to line 26, hereinafter referred to as ground, causing the base of transistor 11 to increase in potential with respect to its emitter. This increases the value of current through transistor 11 and resistor 16, increasing the potential on the base of transistor 12 with respect to the emitter of transistor 12, which reduces the emitter current of transistor 12, and hence the collector current. This results in an increase in voltage at point 45 in a negative sense. The potential at point 46 on the voltage divider composed of resistors 19, 20 and 21, increases in a negative sense. The potential at point 46 may be adjusted to a zero reference value by means of potentiometer 18. The successive voltages between points 42, 47 and 48 will increase in a negative sense as the potential at point 46 increases in a negative sense. However, means comprising potentiometer 40 and rectifier 41 limit the potential at point 42 at the base of transistor 13. This limiting value may be set by the slider on potentiometer 40. This limit on the input electrode of transistor 13 places a limit on the outputs of succeeding transistors 14 and 15, and hence a limit on the current supplied to control winding 9.

Figure 2:
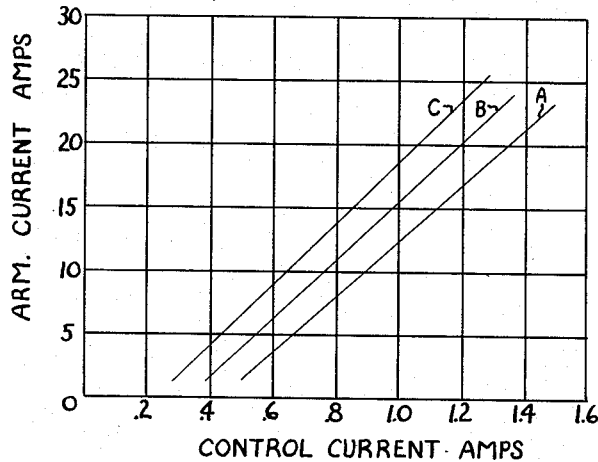
FIGURE 2 is a plot of control current versus armature current plotted from the resultant lists made on a drive embodying our invention.

As the potential at the base of transistor 15 increases in a negative sense, current through the transistor 15 and control winding 9 increases. Increase in current through control winding 9 decreases the reactance of gate windings 2 and 3 which results in increased armature current to provide an increase in electrical torque to compensate for the suddenly applied load. In accordance with an aspect of our invention, full armature current passes through feedback winding 44 in a sense to increase the reactance of gate windings and therefore oppose the action of the control current. This negative current feedback acts to make the output current a linear function of input current as shown in FIG. 2. Because of this linear relationship, the limit placed on the control current also limits the armature current to a predetermined value.

As the armature current increases, bringing the motor back up to speed, the voltage of tachometer 30 increases, decreasing the error signal at point 29 as the electrical torque on the motor armature is increased. Inasmuch as a linear control-armature current relationship is established, the motor rapidly responds to a change in error signal achieve the regulated speed.

While operation of the system has been described with a sudden load increase, it will be apparent that similar operation will occur if a speed change should be commanded by changing the setting of slider 31 on speed reference potentiometer 32. Also, if the load on the motor should suddenly be lightened, operation converse to that described would occur.

The provision of negative current feedback around the motor armature and magnetic amplifier reduces phase shift in the closed loop speed-regulated drive by effectively separating the system time constants with respect to frequency. Stated in another manner, the negative current feedback on the magnetic amplifier has the effect of combining the time constants of the inductance of the armature, inertia of motor and load and the feedback winding into two time constants, only one of which is effective to present significant time delay to a step signal having complex frequency content.

Figure 3:
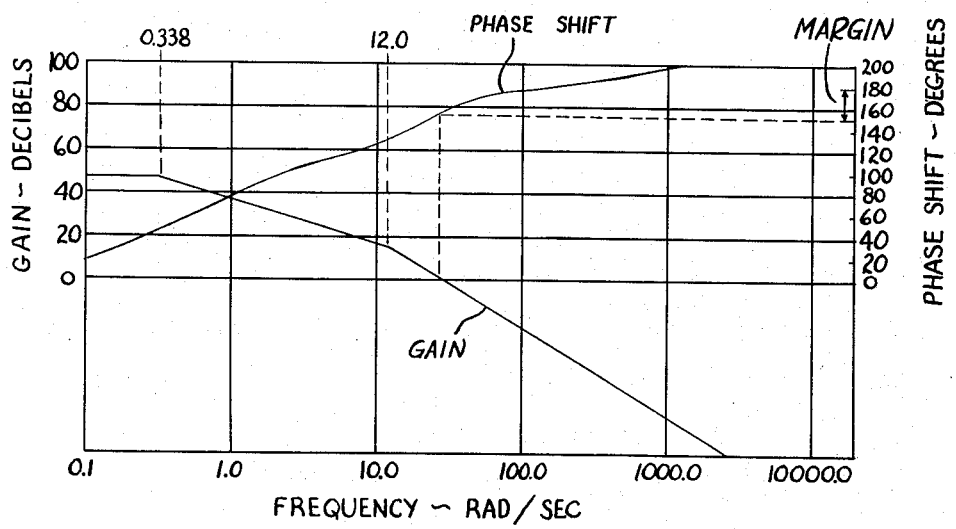
FIGURE 3 is a gain-frequency curve of a speed-regulated drive embodying our invention, plotted from a mathematical analysis of the drive system.

This effective combination and separation of time constants with respect to frequency is illustrated in FIG. 3 which is a curve of system gain versus frequency plotted from a mathematical analysis of a system embodying our invention. This type of curve is often referred to as a Bode diagram. It will be noted that only two breaks occur in the curve above unity gain and phase shift is less than 180 degrees at unity gain by a comfortable margin. This proves the stability of the system.

Negative current feedback on the magnetic amplifier 4 provides system stability and obviates the need for a number of lead-lag networks usually provided to compensate for system phase shift. Furthermore, variations in line voltage at terminals 5 and 6 are now compensated by the current feedback loop, not by feedback through the speed control loop.

The system stability provided by the negative current feedback allows system gain to be increased with resulting increase in response. In the system illustrated, the gain would be increased in the preamplifier both to increase overall system gain and to compensate for loss of gain due to negative feedback on the magnetic amplifier.

Reference is now made to FIG. 2 which illustrates the control-armature current characteristic of a system embodying our invention. Curve A represents constant base speed. Curves B and C represent one-half base speed and one-third base speed respectively.

By way of illustration only, the data for Curve A of FIG. 2 is given for a test of a system of the type shown in FIG. 1. A 7.5 horsepower, 240 volt, 28.5 ampere, 850–2600 r.p.m. shunt wound, direct current motor was used to drive a 15 horsepower, 230 volt, 55 ampere, 1750 r.p.m. generator. At full field and rated armature voltage, the speed of the motor was regulated constant with increasing load and values of control current and armature current taken as the load was increased. This data represented by base speed Curve A of FIG. 2 is as follows:

| Control Current, amperes | Armature Current, amperes |
|---|---|
| .50 | 1.4 |
| .56 | 2.7 |
| .67 | 5.0 |
| .76 | 6.8 |
| .87 | 9.2 |
| .97 | 11.4 |
| 1.06 | 13.6 |
| 1.15 | 15.5 |
| 1.30 | 18.7 |
| 1.43 | 21.4 |
| 1.52 | 23.5 |

Similar test runs made at approximately one-half base speed and approximately one-third base speed yielded the Curves B and C respectively, further indicating the desired linear relationship.

From the curves of FIG. 2, it is readily apparent that by placing a limit on the control current, the armature current may be limited to a particular value. As illustrated in FIG. 1, a voltage limit is applied to the base of transistor 13 to limit the output current of transistor 15. By making the limit control on control current adjustable, an adjustable limit on the output current is obtained. With this arrangement, armature current may be held substantially constant at limit value substantially independent of armature voltage as long as the armature voltage is less than the maximum output voltage of the magnetic amplifier, that is, when the magnetic amplifier is completely saturated and the gate windings present no reactance to the applied alternating current signal.

This current limiting arrangement presents no stability problems presented by current limiting loops heretofore used. In fact, where our current limit arrangement comes into play, it effectively opens the main speed control loop, making the system more simple. In addition, the cost of our limiting arrangement is very small.

The number of turns of control winding 9 and feedback winding 44 will be dependent upon the magnetic amplifier, the size of the motor, and current output of the preamplifier. The proportional relationship of the control current and armature current will be enhanced by increase in the number of turns on the feedback winding (with corresponding increase in the number of turns on the control winding).

While our inventinon has been particularly described as embodied in a speed-regulated electric motor drive system, its application is by no means limited thereto. The invention is equally applicable for regulation of field current of a dynamoelectric machine where field current is supplied through a magnetic amplifier. It is well known that the resistance of field windings of a dynamoelectric machine increases with an increase in temperature thereby reducing the field current.

In another embodiment of our invention, field current of a dynamoelectric machine may be regulated. In this embodiment, as field current decreases due to increased resistance of the field windings, the impedance of the magnetic amplifier gate windings is decreased due to decrease in the feedback current thereby increasing the voltage across the field windings and hence the current therethrough.

This application of our invention may be incorporated in a reel drive system where the motor characteristic to be regulated constant is torque. In this type of system, it is desired to keep the tension on the material being wound up on a drive reel constant, although angular velocity of the reel decreases with build-up of material on the reel. Torque, and therefore tension, may be regulated in this type of system by varying field excitation with reel build-up.

As material builds up on the reel load torque will increase, decreasing the speed of the reel, a signal indicative of reel speed is applied to the control winding of the magnetic amplifier supplying field current to increase the field current to increase electrical torque. The field current flows through the feedback winding. An increase in resistance of the field windings decreases the field current, decreasing the impedance of the gate windings, which results in application of a higher voltage across the field which increases field current, thereby increasing electrical torque to maintain constant tension on the material being wound on the reel.

While our invention has been particularly described and illustrated in a speed-regulated drive system using a single phase magnetic power amplifier and a transistorized preamplifier to facilitate illustration and discussion, it should be understood that it is equally applicable to a system using a three-phase magnetic amplifier and/or other types of preamplifiers. The current limit circuit which we have illustrated as comprising potentiometer 40 and rectifier 41 between ground and the base of transistor 13 is not limited to this location, but may be included at any suitable location to limit the input to the power amplifier. Furthermore, the current limit aspect of our invention need not be limited to a system using a magnetic power amplifier, but is applicable in any system wherein the armature power amplifier has a proportional control-output current relationship.

While we have illustrated and described a speed-regulated drive embodying our invention, changes and modifications to the disclosed structure may occur to those skilled in the art without departing from the spirit and scope of this invention. Accordingly, it is our intention to cover all changes and modifications of the examples of the invention herein chosen for purposes of disclosure which do not constitute departures from the spirit and scope of the invention.

What we claim as new and desire to secure by Letters Patent of the United States is:

1. An electrical system for regulating the speed of a direct current motor comprising, a magnetic amplifier having gate windings for supplying a unidirectional current to a circuit of said motor from an alternating current source, a control winding on said magnetic amplifier for controlling the impedance of said gate windings, means for deriving a speed reference signal, circuit means for providing a speed feedback signal indicative of motor speed, circuit means for comparing said speed reference and said speed indicative signals to obtain a speed regulating signal and apply said regulating signal to said control winding to produce a control current therein to regulate the electrical energy supplied to said motor circuit, a feedback winding on said magnetic amplifier in series with said motor circuit and so poled that the current in said winding opposes the effect of the current in said control winding on said gate windings, the number of turns of said control and said feedback windings being so chosen that the current in said motor circuit varies substantially linearly with the control current, and means for setting a predetermined limit on the current in said control winding to thereby set a corresponding limit on the load current.

2. An electrical system for regulating the speed of a direct current motor comprising, a magnetic amplifier having gate windings for supplying a unidirectional current to a circuit of said motor from an alternating current source, a control winding on said magnetic amplifier for controlling the impedance of said gate windings, means for deriving a speed reference signal, circuit means for providing a speed feedback signal indicative of motor speed, circuit means for comparing said speed reference and said speed indicative signals to obtain a speed regulating signal and apply said regulating signal to said control winding to produce a control current therein to regulate the electrical energy supplied to said motor circuit, a current feedback winding on said magnetic amplifier so poled that the load current in said winding opposes the effect of the current in said control winding on said gate windings, the number of turns of said control and said feedback windings being so chosen that the current in said motor circuit varies substantially linearly with the control current, and means for setting a predetermined limit on the current in said control winding to thereby set a corresponding limit on the load current.

3. An electrical system for regulating the speed of a direct current motor comprising, a magnetic amplifier having gate windings for supplying a unidirectional load current to a circuit of said motor, a control winding on said magnetic amplifier, means for deriving a speed reference signal, first circuit means for providing a speed feedback signal indicative of motor speed, second circuit means for comparing said speed reference and said speed indicative signals to obtain a speed regulating signal and apply said regulating signal to said control winding to produce a control current therein to regulate the electrical energy supplied to said motor circuit, said second circuit means including an amplifying device having a control electrode to which the regulating signal is applied, clamping means for limiting to a predetermined magnitude the regulating signal appearing at said control electrode, a feedback winding on said magnetic amplifier in series with said motor circuit and so poled that the load current opposes the effect of the current in said control winding on said gate windings, the number of turns of said control and said feedback windings being so chosen that the current in said motor circuit varies substantially linearly with the control current, whereby the limit placed on the regulating signal at said control electrode establishes a corresponding current limit on said motor circuit.

4. The arrangement of claim 3 wherein said clamping means comprises a potential source and a diode connected to said control electrode and so poled that said diode becomes conductive to limit the magnitude of the regulating signal when the regulating signal reaches a predetermined magnitude.

References Cited in the file of this patent

Publication, Magnetic Amplifiers by Vickers Electric Division, Vickers Inc., pages 5 and 6.

Publication, Magnetic Amplifiers by H. F. Storm, John Wiley and Sons, 1955, pages 284, 427, and 428.